US011290936B2

(12) United States Patent
Kannan et al.

(10) Patent No.: US 11,290,936 B2
(45) Date of Patent: Mar. 29, 2022

(54) DEVICE STEERING BASED ON PROFILE AND HISTORICAL BEHAVIOR

(71) Applicant: ARRIS Enterprises LLC, Suwanee, GA (US)

(72) Inventors: Navneeth N. Kannan, Doylestown, PA (US); Kurt Alan Lumbatis, Dacula, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/923,616

(22) Filed: Jul. 8, 2020

(65) Prior Publication Data

US 2021/0014760 A1 Jan. 14, 2021

Related U.S. Application Data

(60) Provisional application No. 62/871,696, filed on Jul. 8, 2019.

(51) Int. Cl.
*H04W 4/00* (2018.01)
*H04W 36/16* (2009.01)
(Continued)

(52) U.S. Cl.
CPC ......... *H04W 36/165* (2013.01); *H04W 36/10* (2013.01); *H04W 36/22* (2013.01);
(Continued)

(58) Field of Classification Search
USPC .......................... 370/328, 329, 330; 455/516
See application file for complete search history.

(56) References Cited

U.S. PATENT DOCUMENTS 9,749,901 B2 * 8/2017 Seok .................... H04W 84/12
11,019,560 B2 * 5/2021 Likar ................... H04W 12/73
(Continued)

OTHER PUBLICATIONS

International Search Report dated Oct. 5, 2020 in International (PCT) Application No. PCT/US2020/041145.
(Continued)

*Primary Examiner* — David Q Nguyen
(74) *Attorney, Agent, or Firm* — Wenderoth, Lind & Ponack, L.L.P.

(57) ABSTRACT

During operation, an access point aggregates communication-performance information and behavior information in a wireless local area network (WLAN) corresponding to an electronic device, where the communication-performance information and the behavior information are aggregated over a time interval that is longer than an instance of a connection or association of the electronic device to the WLAN. Then, the access point provides the communication-performance information and the behavior information to a second electronic device. After receiving information about another instance of a connection or association of the electronic device to the WLAN, the access point provides a request to the second electronic device for historical information about communication performance and behavior of the electronic device in the WLAN. Moreover, after receiving the historical information, the access point selectively provides the transition recommendation in the WLAN to the electronic device, where the transition recommendation is based at least in part on the historical information.

18 Claims, 5 Drawing Sheets

(51) Int. Cl.
*H04W 36/10* (2009.01)
*H04W 36/22* (2009.01)
*H04W 36/24* (2009.01)
*H04W 36/38* (2009.01)
*H04W 84/12* (2009.01)
*H04W 88/08* (2009.01)

(52) U.S. Cl.
CPC ......... *H04W 36/245* (2013.01); *H04W 36/38* (2013.01); *H04W 84/12* (2013.01); *H04W 88/08* (2013.01)

(56) References Cited

U.S. PATENT DOCUMENTS

| | | |
|---|---|---|
| 2013/0029635 A1 | 1/2013 | Choi-Grogan et al. |
| 2014/0355566 A1 | 12/2014 | Walley et al. |
| 2016/0255604 A1* | 9/2016 | Venkatraman ........ H04W 64/00 455/456.1 |
| 2016/0295485 A1 | 10/2016 | Ponnuswamy |
| 2018/0007516 A1* | 1/2018 | Ge ........................ H04W 64/00 |
| 2018/0041408 A1* | 2/2018 | Dagum ................. G06F 3/0481 |
| 2018/0359730 A1* | 12/2018 | Jung ....................... H04K 3/822 |
| 2019/0297545 A1* | 9/2019 | Ramachandra ............................. H04W 36/00835 |

OTHER PUBLICATIONS

International Preliminary Report on Patentability dated Jan. 11, 2022, in International (PCT) Application No. PCT/US2020/041145.

* cited by examiner

DEVICE STEERING BASED ON PROFILE AND HISTORICAL BEHAVIOR

BACKGROUND

Field

The described embodiments relate to techniques for communicating information among electronic devices. Notably, the described embodiments relate to techniques for selectively recommending a transition within a wireless local area network (WLAN) based at least in part on a device profile and historical behavior in the WLAN.

Related Art

Many electronic devices are capable of wirelessly communicating with other electronic devices. For example, these electronic devices can include a networking subsystem that implements a network interface for a WLAN, e.g., a wireless network such as described in the Institute of Electrical and Electronics Engineers (IEEE) 802.11 standard. For example, a wireless network may include an access point that communicates wirelessly with one or more associated electronic devices (which are sometimes referred to as "clients").

Many WLANs include multiple access points that allow electronic devices to connect to a wired network, such as an intranet or the Internet. For example, in order to access the wired network, an electronic device may associate with one of the access points in a WLAN.

However, in a WLAN with multiple access points, it can be difficult to maintain communication performance. Notably, some of the access points may have more associated electronic devices than the remaining access points. Moreover, the electronic devices may consume different amounts of the available network resources in the WLAN. For example, some electronic devices may communicate more packets or frames than other electronic devices. Consequently, a subset of the access points in the WLAN may have higher loading than the remaining access points, which can degrade the communication performance.

SUMMARY

The described embodiments relate to an access point that selectively provides transition recommendations in a WLAN (which is sometimes referred to as "steering"). This access point includes: a network node; an antenna node that couples to an antenna; and an interface circuit. The interface circuit may communicate via wired or wireless communication with an electronic device in a WLAN, and may communicate via wired or wireless communication with a second access point in the WLAN and a second electronic device in a second network. During operation, the access point may aggregate communication-performance information and behavior information in the WLAN corresponding to the electronic device, where the communication-performance information and the behavior information is aggregated over a time interval that is longer than an instance of a connection or association of the electronic device to the WLAN. Moreover, the access point may provide the communication-performance information and the behavior information to the second electronic device. Subsequently, when the access point receives information about another instance of a connection or association of the electronic device to the WLAN, the access point may request from the second electronic device historical information about communication performance and behavior of the electronic device in the WLAN. Next, after receiving the historical information from the second electronic device, the access point may selectively provide a transition recommendation in the WLAN to the electronic device, where the transition recommendation is based at least in part on the historical information.

In some embodiments, the access point may receive profile information associated with the electronic device and may provide the profile information to the second electronic device. For example, the profile information may be received from the electronic device via wireless communication (i.e., directly) or from the second access point via wired or wireless communication (i.e., indirectly). Note that the access point may obfuscate at least a portion of the profile information (such as a media access control or MAC address of the electronic device) before the profile information is provided to the second electronic device. The profile information may include: the MAC address (or, more generally, a client identifier), a type of the electronic device, an operating system of the electronic device, and/or a version of the operating system.

Then, when the access point receives the information about the other instance of the connection or association of the electronic device to the WLAN, the access point may request the profile information from the second electronic device. Note that the information about the other instance of the connection or association of the electronic device to the WLAN may be received from the electronic device via wireless communication (i.e., directly) or from the second access point via wired or wireless communication (i.e., indirectly). Moreover, the transition recommendation may be based at least in part on the profile information.

Furthermore, the communication-performance information and the behavior information may correspond to multiple electronic devices that communicate via the WLAN. For example, the communication-performance information and the behavior information may include: a received signal strength of a given electronic device, a data rate of the given electronic device, a throughput of the given electronic device, a capacity of the given electronic device, a usage of the given electronic device, a location of the given electronic device, a given access point that is associated with the given electronic device, and/or a number of connected electronic devices in the WLAN.

Additionally, the second electronic device may be a controller for the WLAN (such as a cloud-based controller, which is remotely located from the WLAN). Note that the second network may include the Internet.

In some embodiments, the transition recommendation may be compatible with an Institute of Electrical and Electronics Engineers (IEEE) 802.11 standard (such as IEEE 802.11v).

Moreover, the transition recommendation may be based at least in part on a result of at least a previous transition recommendation in the WLAN. Furthermore, the access point may provide a request for second historical information about the previous transition recommendations to the second electronic device, and may receive the second historical information from the second electronic device.

Additionally, the transition recommendation may recommend that the electronic device transition to a different access point in the WLAN, to a different channel in the WLAN (such as a different frequency band), or to a different wireless network. Note that the different wireless network may include a cellular-telephone network.

In some embodiments, the access point and the second access point may have a common configuration, including common access credentials.

Another embodiment provides the second access point.

Another embodiment provides the second electronic device.

Another embodiment provides a computer-readable storage medium for use with the access point, the second access point or the second electronic device. When executed by the access point, the second access point or the second electronic device, this computer-readable storage medium causes the access point, the second access point or the second electronic device to perform at least some of the aforementioned operations or counterparts to at least some of the aforementioned operations.

Another embodiment provides a method, which may be performed by the access point, the second access point or the second electronic device. This method includes at least some of the aforementioned operations or counterparts to at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point that selectively provide a transition recommendation is described. During operation, the access point may aggregate communication-performance information and behavior information in the WLAN corresponding to an electronic device, where the communication-performance information and the behavior information is aggregated over a time interval that is longer than an instance of a connection or association of the electronic device to the WLAN. Then, the access point may provide the communication-performance information and the behavior information to a second electronic device. After receiving information about another instance of a connection or association of the electronic device to the WLAN, the access point may provide a request to the second electronic device for historical information about communication performance and behavior of the electronic device in the WLAN. Moreover, after receiving the historical information, the access point may selectively provide the transition recommendation in the WLAN to the electronic device, where the transition recommendation is based at least in part on the historical information, profile information associated with the electronic device and/or a result of at least a previous transition recommendation in the WLAN.

By selectively providing the transition recommendation using knowledge about the electronic device and its communication performance and behavior in the WLAN, this communication technique may facilitate dynamic load balancing in the WLAN and/or with another wireless network (such as a cellular-telephone network). This capability may improve communication performance (such as improved throughput, load balancing and robust communication) in the WLAN. Consequently, the communication technique may improve the user experience when using the access point and communicating via the WLAN without increasing the cost or the complexity of the WLAN.

In the discussion that follows, the electronic device and the access point communicate packets in accordance with a wireless communication protocol, such as an Institute of Electrical and Electronics Engineers (IEEE) 802.11 standard (which is sometimes referred to as "Wi-Fi," from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in the network using a wireless communication protocol (such as IEEE 802.11 or another type or wireless interface) or a wired communication protocol, such as: an IEEE 802.3 standard (which is sometimes referred to as "Ethernet"), a cable modem communication protocol (such as a communication protocol that is compatible with a Data of Cable Service Interface Specification or DOCSIS), a communication protocol that provides mobile LTE backhaul, e.g., to a mobile network core and/or another type of wired interface. In the discussion that follows, Ethernet is used as an illustrative example of communication among access points in a WLAN and between one or more gateway access points and a network that is external to a WLAN.

Figure 1:
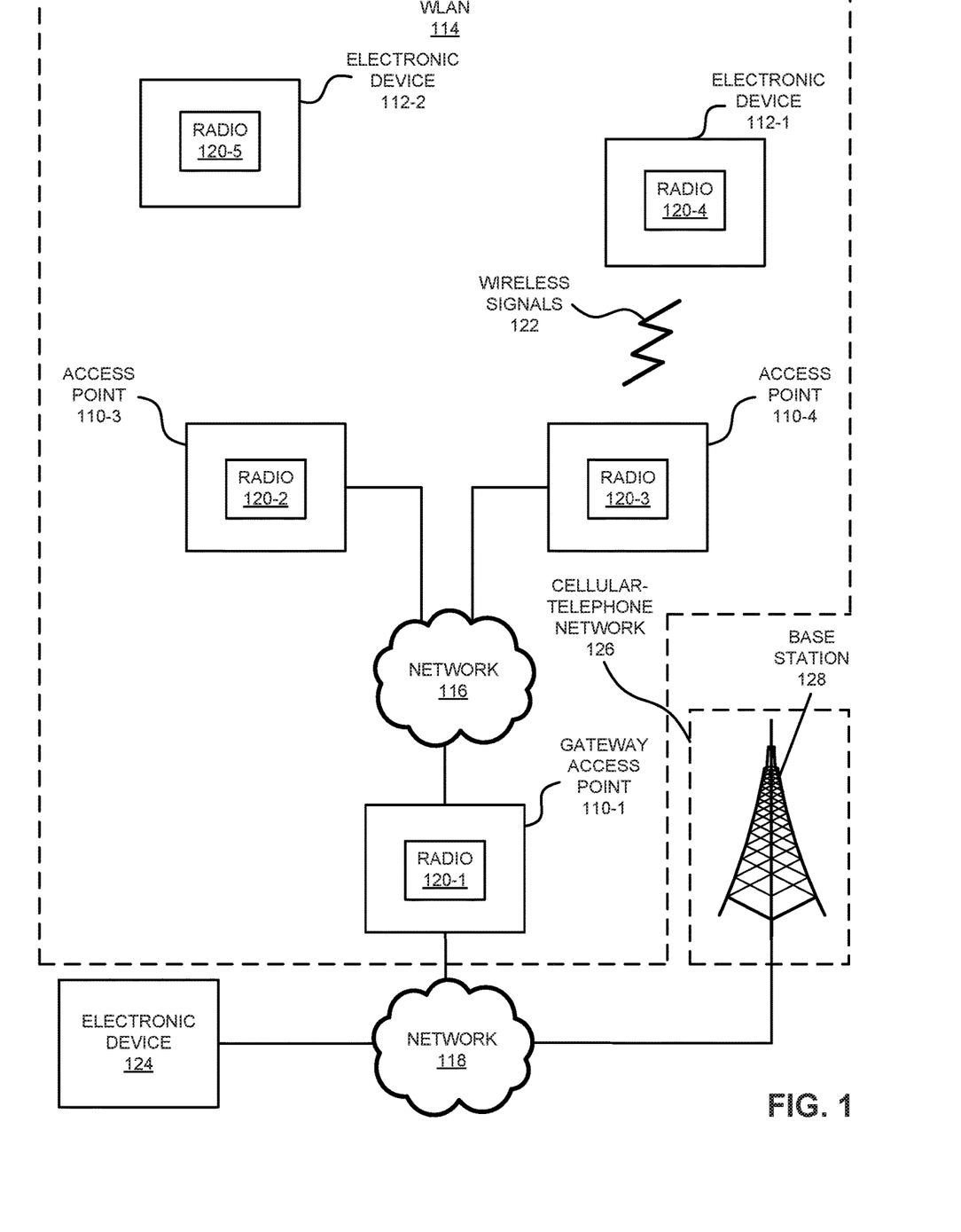
FIG. 1 is a block diagram illustrating communication among access points and electronic devices in a subnet in accordance with an embodiment of the present disclosure.

FIG. 1 presents a block diagram illustrating an example of communication among one or more access points 110 and electronic devices 112 (such as a cellular telephone, and which are sometimes referred to as "clients") in a WLAN 114 in accordance with some embodiments. Access points 110 may be arranged in a hierarchy in WLAN 114. Notably, access points 110 may communicate with each other in WLAN 114 using wireless and/or wired communication (such as by using Ethernet or a communication protocol that is compatible with Ethernet). Moreover, at least some of access points 110 may have specific functions in WLAN 114, such as one or more gateway access points (e.g., gateway access point 110-1) that provide access to network 118 (such as an intranet, the Internet, a cable network, a cellular-telephone network, etc.). Note that access points 110 may include a physical access point and/or a virtual access point that is implemented in software in an environment of an electronic device or a computer. In addition, at least some of access points 110 (such as access points 110-2 and 110-3) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches (not shown). Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique. Note that gateway access point 110-1 may support wired communication within WLAN 114 (such as Ethernet), wireless communication within WLAN 114 (such as Wi-Fi) and a wired communication protocol for communicating via network 118 (such as Ethernet). For example, gateway access point 110-1 may communicate via network 118 with an electronic device 124 (such as a computer or a server) that implements a cloud-based controller for WLAN 114.

Figure 5:
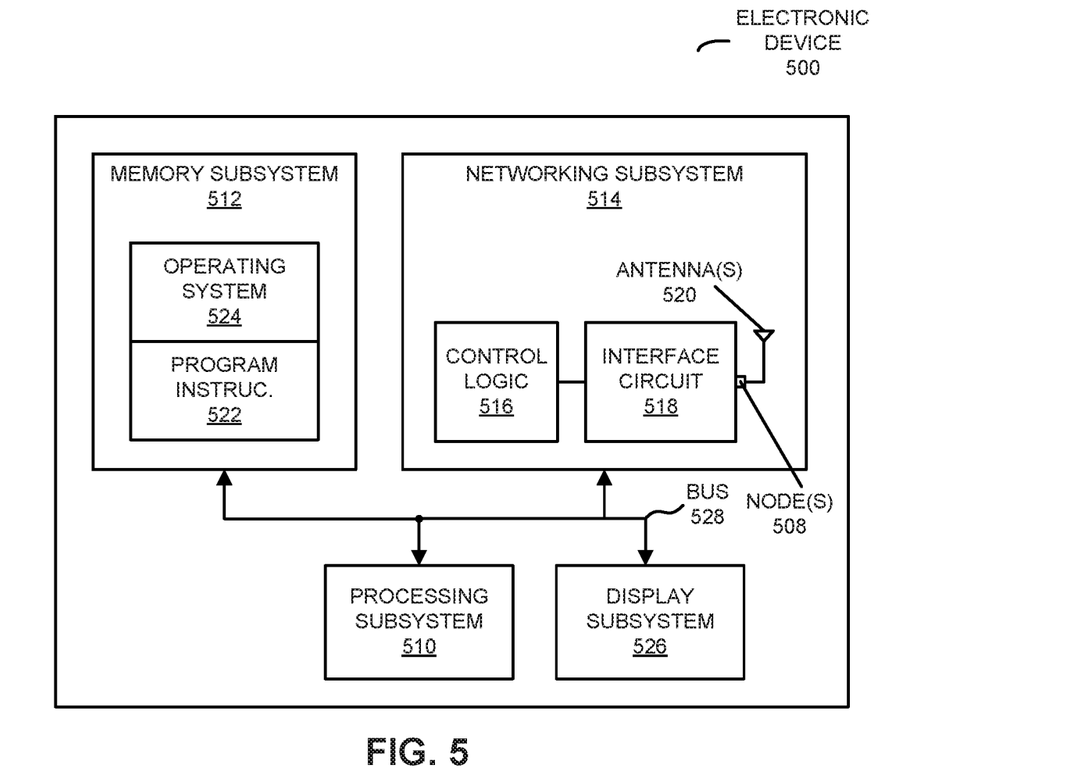
FIG. 5 is a block diagram illustrating an electronic device in accordance with an embodiment of the present disclosure.

As described further below with reference to FIG. 5, access points 110, electronic devices 112 and/or electronic device 124 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-3 in access point 110-3. These wireless signals may be received by radio 120-4 in electronic device 112-1. Notably, access point 110-3 may transmit packets. In turn, these packets may be received by electronic device 112-1. Moreover, access point 110-3 may allow electronic device 112-1 to communicate with other electronic devices, computers and/or servers via networks 116 and/or 118.

Note that the communication among access points 110 and/or with electronic devices 112 may be characterized by a variety of performance metrics, such as: a received signal strength (RSSI), a data rate, a data rate for successful communication (which is sometimes referred to as a "throughput"), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 seconds) to an estimated maximum number of bytes that can be communicated in the time interval (the latter of which is sometimes referred to as the "capacity" of a communication channel or link), and/or a ratio of an actual data rate to an estimated data rate (which is sometimes referred to as "utilization").

In the described embodiments processing a packet or frame in access points 110 and electronic devices 112 includes: receiving signals (such as wireless signals 122) with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Depending on the activity in WLAN 114 and/or network 118, one or more of access points 110 can become overloaded, which can result in degraded communication performance in WLAN 114. In principle, when this occurs, a given one of access points 110 (such as access point 110-3) may selectively provide one or more transition recommendations. For example, the transition recommendation may recommend that an associated electronic device (such as electronic device 112-1) transition to another one of access point 110 in WLAN 114 or to another channel (such as in a different frequency band, e.g., 2.4 GHz, 5 GHz, 60 GHz or another band of frequencies) with access point 110-3.

However, in practice, it can be difficult to correctly determine whether a transition recommendation is necessary and, if yes, to provide an appropriate or optimal transition recommendation (such as an appropriate one of access points or channels for the transition). Notably, access point 110-3 may have insufficient information about electronic device 112-1 and/or communication performance and behavior of electronic device 112-1 in WLAN 114 (e.g., over an extended time interval) with which to make transition recommendations (such as whether a transition is need and/or where to transition to).

These problems may be addressed using the communication technique. Notably, in the communication technique, device-specific information may be stored in a local controller (such as gateway access point 110-1) and/or a remote controller (such as electronic device 124) for WLAN 114. This device-specific information may provide current and historical situational awareness and context for communication performance and behaviors of one or more of electronic devices 112 in WLAN 114 to allow gateway access point 110-1 to make improve decisions about a transition recommendation in WLAN 114. For example, in a hybrid approach, decisions about a transition recommendation may be made locally by gateway access point 110-1 while at least some of the device-specific information is stored remotely (such as in or associated with electronic device 124). This approach may leverage the long-time-scale archival capability of electronic device 124 with the low-latency or fast-response time of gateway access point 110-1.

Figure 2:
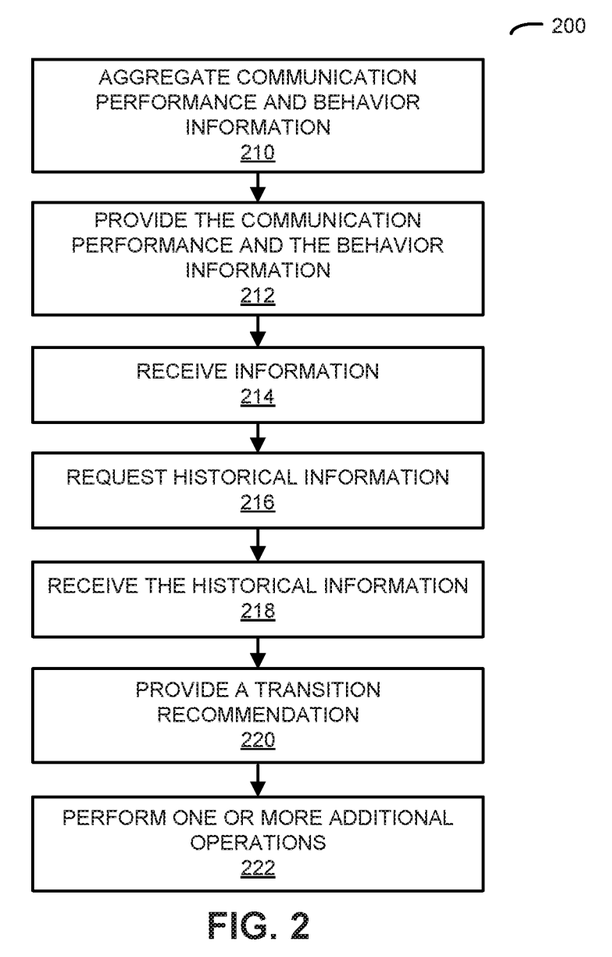
FIG. 2 is a flow diagram illustrating a method for selectively providing a transition recommendation using an access point in FIG. 1 in accordance with an embodiment of the present disclosure.

As described further below with reference to FIGS. 2-4, gateway access point 110-1 may aggregate communication-performance information and behavior information in WLAN 114 corresponding to one or more of electronic devices 112 (such as electronic device 112-1), where the communication-performance information and the behavior information is aggregated over a time interval that is longer than an instance of a connection or association of electronic device 112-1 to WLAN 114. For example, electronic device 112-1 may be associated with gateway access point 110-1, so that gateway access point 110-1 can directly aggregate the communication-performance information and the behavior information. Alternatively, electronic device 112-1 may be associated with another access point (such as access point 110-3), which provides the communication-performance information and the behavior information to gateway access point 110-1.

Moreover, gateway access point 110-1 may provide, via network 118, the communication-performance information and the behavior information to electronic device 124, which may store the communication-performance information and the behavior information in memory.

Subsequently, gateway access point 110-1 may receive information about another instance of a connection or association of electronic device 112-1 to WLAN 114. For example, electronic device 112-1 may associate with gateway access point 110-1 or may associate with another access point (such as access point 110-2), which provides the information to gateway access point 110-1. Thus, the information about the other instance of the connection or association of electronic device 112-1 to WLAN 114 may be received from electronic device 112-1 via wireless communication (i.e., directly) or from access point 110-2 via wired or wireless communication (i.e., indirectly). In response to receiving the information, gateway access point 110-1 may provide a request, via network 118, to electronic device 124 for historical information about communication performance and behavior of electronic device 112-1 in WLAN 114. After receiving the request, electronic device 124 may access and provide the historical information to gateway access point 110-1 via network 118.

Based on the historical information, gateway access point 110-1 may selectively provide, via WLAN 114, a transition recommendation in the WLAN to electronic device 112-1. For example, gateway access point 110-1 may, as needed, provide the transition recommendation to electronic device 112-1 by wireless communication. Alternatively, gateway access point 110-1 may forward, via wired or wireless communication, the transition recommendation to access point 110-2, which provides the transition recommendation to electronic device 112-1 via wireless communication. Note that the transition recommendation may be compatible with an IEEE 802.11 standard, such as IEEE 802.11v.

Moreover, the transition recommendation may recommend that electronic device 112-1 transition to a different access point in WLAN 114 (such as access point 110-3, which may provide better communication performance to electronic device 112-1), to a different channel in WLAN 114 (such as a different frequency band), or to a different wireless network. For example, the different wireless network may include a cellular-telephone network 126, which may be accessed via base station 128.

In some embodiments, the transition recommendation is based at least in part on additional information, such as profile information associated with electronic device 112-1. For example, when electronic device 112-1 associates with WLAN 114 (such as a first time electronic device 112-1 associates with WLAN 114), gateway access point 110-1 may receive the profile information associated with electronic device 112-1, and may provide, via network 118, the profile information to electronic device 124. For example, the profile information may be received from electronic device 112-1 via wireless communication in WLAN 114 (i.e., directly) or from access point 110-2 via wireless communication in WLAN 114 or wired communication via network 116 (i.e., indirectly). Note that gateway access point 110-1 may obfuscate (such as by using a hash table or function) at least a portion of the profile information (such as a MAC address of electronic device 112-1) before the profile information is provided to electronic device 124. The profile information may include: the MAC address (or, more generally, a client identifier of electronic device 112-1), a type or model of electronic device 112-1, a configuration of electronic device 112-1, a capability of electronic device 112-1, an operating system of electronic device 112-1, and/or a version of the operating system.

Then, when gateway access point 110-1 receives the information about the other instance of the connection or association of electronic device 112-1 to WLAN 114, gateway access point 110-1 may request the profile information from electronic device 124.

Moreover, the transition recommendation may be based at least in part on a result of at least a previous transition recommendation in WLAN 114, such as whether the previous transition recommendation was accepted. In some embodiments, second information that specifies a result of at least a previous transition recommendation may be stored locally in gateway access point 110-1. Alternatively or additionally, gateway access point 110-1 may provide a request, via network 118, for the second historical information about the previous transition recommendations to electronic device 124, and may receive, via network 124, the second historical information from electronic device 124.

While electronic device 112-1 is used as an illustration in the previous discussion, in general the communication-performance information and the behavior information may correspond to multiple electronic devices that communicate via WLAN 114, such as electronic devices 112-1 and 112-2. Note that the communication-performance information and the behavior information may be device-specific. The communication-performance information and the behavior information may include: a received signal strength (such as an RSSI) of a given electronic device in electronic devices 112, a data rate of the given electronic device, a throughput of the given electronic device, a capacity of the given electronic device, a usage of the given electronic device, a location of the given electronic device in WLAN 114, a given access point that is associated with the given electronic device (such as access point 110-2), and/or a number of connected electronic devices in WLAN 114 (such as two electronic devices). Thus, the transition recommendation may be based at least in part on a communication metric of or associated with one or more of electronic devices 112 (such as electronic device 112-1).

In order to facilitate the transition in WLAN 114, in some embodiments access points 110 may have a common configuration, including common access credentials.

In this way, gateway access point 110-1 may facilitate load balancing or sharing among access points 110 and/or bands of frequencies in WLAN 114. This dynamic load balancing may be performed in a device-specific manner, and may be based at least in part on historical information about communication performance and behavior (such as locations in WLAN 114) associated with one or more of electronic devices 112, and/or responses to previous transition recommendations. This situational awareness may allow gateway access point 110-1 to make more-informed or improved transition recommendations, which are more likely to be accepted and, thus, more likely to facilitate load balancing in and improved communication performance (such as latency or throughput) of WLAN 114.

While FIG. 1 illustrates access points 110 having particular functionality (such as that gateway access point 110-1 may be a local controller for WLAN 114, etc.), in other embodiments some or all of access points 110 may be capable of performing at least some of the operations in the communication technique. In some embodiments, additional operations in the communication technique, such as selectively providing a transition recommendation, are performed by electronic device 124. Moreover, in general, information used in the communication technique may be stored locally (such as in gateway access point 110-1) and/or remotely (such as in or associated with electronic device 124).

We now describe embodiments of the method. FIG. 2 presents a flow diagram illustrating an example of a method 200 for selectively providing a transition recommendation using an access point in a WLAN, such as gateway access point 110-1 in FIG. 1. This access point may communicate via wired or wireless communication with an electronic device in a WLAN, and may communicate via wired or wireless communication with a second access point in the WLAN and a second electronic device in a second network.

During operation, the access point may aggregate communication-performance information and behavior information (operation 210) in the WLAN corresponding to the electronic device, where the communication-performance information and the behavior information is aggregated over a time interval that is longer than an instance of a connection or association of the electronic device to the WLAN.

Moreover, the access point may provide the communication-performance information and the behavior information (operation 212) to the second electronic device.

Subsequently, the access point may receive information (operation 214) about another instance of a connection or association of the electronic device to the WLAN. Note that the information about the other instance of the connection or association of the electronic device to the WLAN may be received from the electronic device via wireless communication (i.e., directly) or from the second access point via wired or wireless communication (i.e., indirectly).

In response, the access point may request from the second electronic device historical information (operation 216) about communication performance and behavior of the electronic device in the WLAN. Furthermore, the access point may receive from the second electronic device the historical information (operation 218).

Next, the access point may selectively provide a transition recommendation (operation 220) in the WLAN to the electronic device, where the transition recommendation is based at least in part on the historical information. The transition recommendation may recommend that the electronic device transition to a different access point in the WLAN, to a different channel in the WLAN (such as a different frequency band), or to a different wireless network. Note that the different wireless network may include a cellular-telephone network.

In some embodiments, the access point may optionally perform one or more additional operations (operation 222). Notably, the access point may receive profile information associated with the electronic device and may provide the profile information to the second electronic device. For example, the profile information may be received from the electronic device via wireless communication (i.e., directly) or from the second access point via wired or wireless communication (i.e., indirectly). Moreover, the access point may obfuscate at least a portion of the profile information (such as a MAC address or a client identifier of the electronic device) before the profile information is provided to the second electronic device. For example, the access point may apply a secure (such as a one-way) hash function to the MAC address or the client identifier. The profile information may include: the MAC address (or, more generally, a client identifier), a type of the electronic device, an operating system of the electronic device, and/or a version of the operating system. Then, when the access point receives the information about the other instance of the connection or association of the electronic device to the WLAN (operation 214), the access point may request the profile information from the second electronic device. Furthermore, the transition recommendation may be based at least in part on the profile information.

Additionally, the communication-performance information and the behavior information may correspond to multiple electronic devices that communicate via the WLAN. For example, the communication-performance information and the behavior information may include: a received signal strength of a given electronic device, a data rate of the given electronic device, a throughput of the given electronic device, a capacity of the given electronic device, a usage of the given electronic device, a location of the given electronic device, a given access point that is associated with the given electronic device, and/or a number of connected electronic devices in the WLAN.

In some embodiments, the second electronic device may be a controller for the WLAN (such as a cloud-based controller, which is remotely located from the WLAN). Moreover, the second network may include the Internet.

Furthermore, the transition recommendation may be compatible with an IEEE 802.11 standard (such as IEEE 802.11v).

Additionally, the transition recommendation may be based at least in part on a result of at least a previous transition recommendation in the WLAN. For example, the access point may provide a request for second historical information about the previous transition recommendations to the second electronic device, and may receive the second historical information from the second electronic device.

In some embodiments, the access point and the second access point may have a common configuration, including common access credentials (such as a one service set identifier and passphrase). This common configuration may facilitate transitions within the WLAN.

Figure 3:
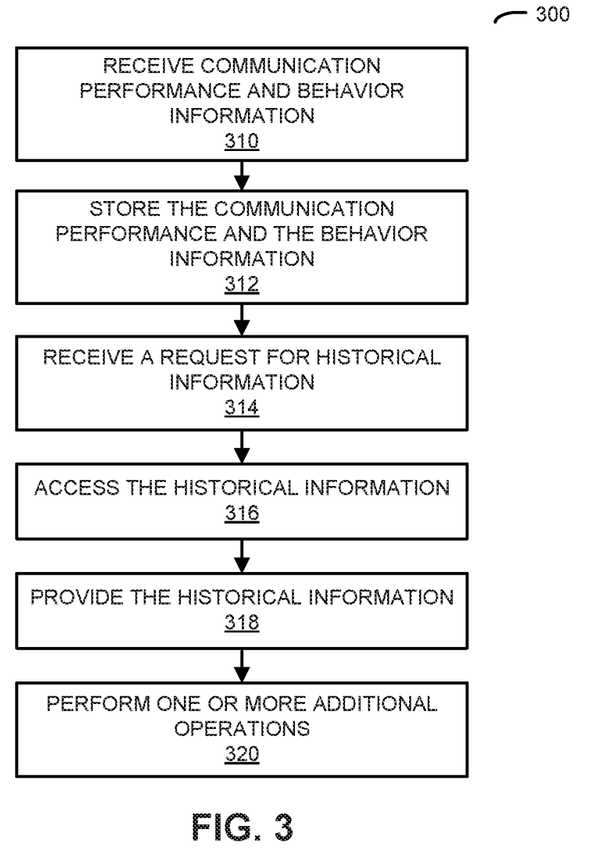
FIG. 3 is a flow diagram illustrating a method for providing historical information about communication performance and behavior in a WLAN using an electronic device in FIG. 1 in accordance with an embodiment of the present disclosure.

FIG. 3 presents a flow diagram illustrating an example of a method 300 for providing historical information about communication performance and behavior in a WLAN using a second electronic device, such as electronic device 124 in FIG. 1. This electronic device may communicate via wired or wireless communication with an access point in the WLAN.

During operation, the second electronic device may receive communication-performance information and the behavior information (operation 310) from the access point. In response, the second electronic device may store the communication-performance information and the behavior information (operation 312). For example, the communication-performance information and the behavior information may be stored in memory in or associated with the electronic device.

Then, the second electronic device may receive a request from the access point for historical information (operation 314) about communication performance and behavior of the electronic device in the WLAN. For example, the request may include information that specifies the electronic device, such as a MAC address or a client identifier. In some embodiments, the MAC address or the client identifier is obfuscated. For example, the MAC address or the client identifier may have been mapped using a secure hashing function.

In response, the second electronic device may access the historical information (operation 316) in the memory based at least in part on the MAC address or the client identifier.

Next, the second electronic device may provide the historical information (operation 318) to the access point.

In some embodiments, the second electronic device may optionally perform one or more operations (operation 320). Notably, the second electronic device may receive profile information associated with the electronic device in the WLAN. The second electronic device may store the profile information in the memory. Subsequently, the second electronic device may receive a second request for the profile information from the access point. The second request may include information that specifies the electronic device, such as a MAC address or a client identifier. In some embodiments, the MAC address or the client identifier is obfuscated so that the second electronic device may not have access to the real MAC address or the real client identifier. For example, the MAC address or the client identifier may have been mapped using a secure hashing function. In response, the second electronic device may access the profile information in the memory based at least in part on the MAC address or the client identifier. Next, the second electronic device may provide the profile information to the access point.

Moreover, when the second electronic device receives obfuscated information about the electronic device, the second electronic device may optionally de-code or de-obfuscate this information, e.g., using a hash function corresponding to a hash function used by the access point to obfuscate the information. However, in other embodiments, the second electronic device may use the obfuscated information. For example, the historical information and/or the profile information may be stored in the memory and may be indexed or associated with an obfuscated MAC address or client identifier. Consequently, in these embodiments, the second electronic device may access this stored information using the obfuscated MAC address or client identifier.

In some embodiments of methods 200 (FIG. 2) and/or 300, there may be additional or fewer operations. Furthermore, the order of the operations may be changed, and/or two or more operations may be combined into a single operation.

Figure 4:
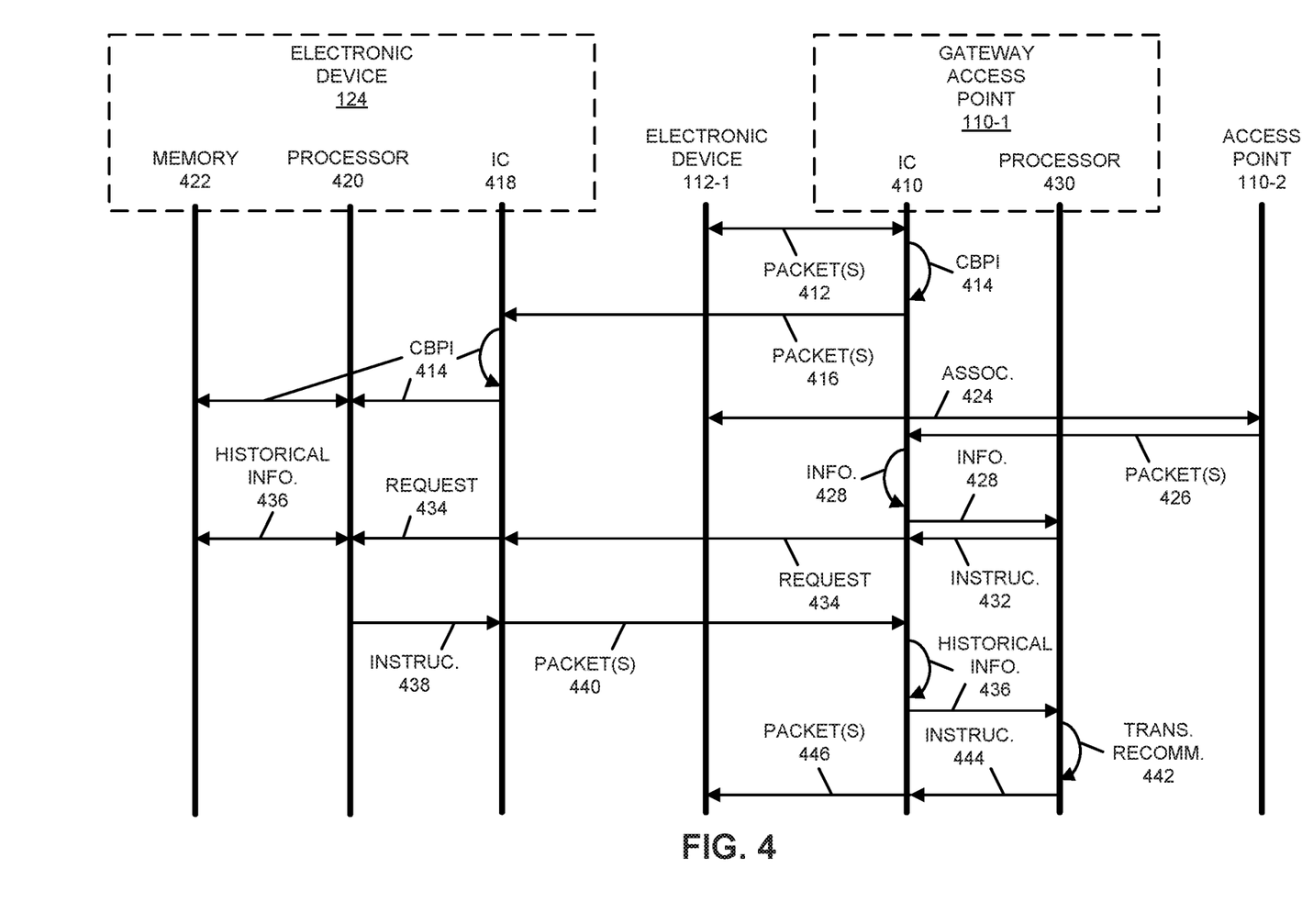
FIG. 4 is a drawing illustrating communication among the electronic devices in FIG. 1 in accordance with an embodiment of the present disclosure.

FIG. 4 presents a drawing illustrating an example of communication among gateway access point 110-1, access point 110-2, electronic device 112-1 and electronic device 124. Notably, an interface circuit (I.C.) 410 in gateway access point 110-1 communicates one or more packets 412 or frames with electronic device 112-1 in a WLAN. Based on this communication, interface circuit 410 may aggregate communication-performance information and behavior information (CPBI) 414 over a time interval that is longer than an instance of a connection or association of electronic device 112-1 to the WLAN.

Then, interface circuit 410 provides one or more packets 416 or frames to electronic device 124 with CPBI 414. After receiving the one or more packets 416 or frames, interface circuit 418 in electronic device 124 may extract CPBI 414 and may provide CPBI 414 to processor 420 in electronic device 124. In response, processor 420 may store CPBI 414 in memory 422 in electronic device 124.

Subsequently, electronic device 112-1 may establish another instance of a connection or association 424 with, e.g., access point 110-2 in the WLAN. In response, access point 110-2 may provide one or more packets 426 or frames with information 428 that indicates or specifies that electronic device 112-1 has the connection or association 424 in the WLAN.

After receiving the one or more packets 426 or frames, interface circuit 410 may extract information 428, and may provide information 428 to processor 430 in gateway access point 110-1. In response, processor 430 may instruct 432 interface circuit 410 to provide a request 434 (e.g., in one or more packets or frames) for historical information 436 about CPBI 414 of at least electronic device 112-1 in the WLAN to electronic device 124.

Next, interface circuit 418 may provide request 434 to processor 420, which may access the historical information 436 in memory 422. Then, processor 420 may instruct 438 interface circuit 418 to provide the historical information 436 in one or more packets 440 or frames to gateway access point 110-1.

Moreover, after receiving the one or more packets 440 or frames, interface circuit 410 may extract and provide the historical information 436 to processor 430. Using the historical information 436 (and other optional information, such as profile information of electronic device 112-1 and/or information about responses to previous transition recommendations), processor 430 may determine whether to provide a transition recommendation 442 to electronic device 112-1. If yes, processor 430 may provide an instruction 444 to interface circuit 410, which then provides the transition recommendation 442 in one or more packets 446 or frames to electronic device 112-1.

After receiving the transition recommendation 442 in the one or more packets 446 or frames, electronic device 112-1 may determine whether or not to perform the recommended transition, such as to a different band of frequencies, a different access point in the WLAN, or to a different network (such as a cellular-telephone network).

While FIG. 4 illustrates communication between components using unidirectional or bidirectional communication with lines having single arrows or double arrows, in general the communication in a given operation in these figures may involve unidirectional or bidirectional communication.

Note that self-organization network (SON) solutions in WLANs may help ensure optimum organization of the access points and associated electronic devices (which are sometimes referred to as "stations" or "clients") in a deterministic closed environment using one or more techniques. For example, one technique used for achieving a SON is the concept of steering of a client, which may, e.g., allow the client to be steered from one band of frequencies to another (such as from 2.4 GHz to 5 GHz), or forcing the association from a current access point to a different access point.

Given the ubiquitous nature of wireless electronic devices, and the need to cover more areas and remote locations within homes, techniques for establishing SON networks are increasingly needed in residential environments. For example, this capability can help facilitate the streaming of video, such as from a webcam in a garage.

However, it can be difficult to implement a SON network in a home. Notably, there can be different architectures for control of a WLAN. In one approach, local control in a WLAN is implemented using one or more of the access points in a residential environment, such as a home. This local control may be independent of the topology or arrangement of the access points, such as a star configuration with a hub or a distributed or peer-peer configuration, such as mesh network. In another approach, the WLAN is controlled via the cloud, i.e., SON decisions may be made by a cloud-based controller for the WLAN.

When local control is used, it can be difficult to establish a SON or to manage the WLAN. Notably, detailed knowledge about the nature of the clients connected to or associated with various access points in the WLAN is often unavailable, because the available data typically can only be derived or obtained from the clients. Moreover, resource constraints usually prevent one or more local controllers from examining historical communication performance and behavior in the WLAN over long periods of time (such as days or weeks).

In principle, a cloud-based controller can overcome the resource constraints, and can collect data on historical communication performance and behavior in the WLAN over long periods of time. However, a lack of detailed device knowledge can still be a potential constraint. Moreover, cloud-based control typically does not have the same reaction time to local situations, and the resulting latency can have a detrimental effect on communication performance and, thus, on the user experience.

For example, a typical use-case example is that of a subscriber using a video/phone conversation application while moving about within a home (such as walking from one place to another). Because the electronic device is mobile, it is likely that the electronic device may become associated with an access point with (relatively) poor RSSI, which may result in packet errors or dropped packets and, eventually, call disruption. A two-way protocol with a cloud-based controller may be susceptible to latency issues that can exacerbate service disruptions. Notably, the process of problem detection, analysis and "reorganization" in terms of the client being steered to, e.g., a different access point may not occur within the application tolerance.

In the disclosed communication technique, clients can be steered to different bands of frequencies (such as 2.4 GHz, 5 GHz, 60 GHz or another band of frequencies), as well as to different access points or wireless networks. However, given the wide variety of client devices, in terms of device categories (such as laptops, cellular telephones, tablets, Internet-of-things devices, video set-top boxes, etc.), Wi-Fi capabilities (e.g., a number of spatial streams, transmit power, radio support etc.), and constraining factors (e.g., operating systems, Wi-Fi chip behaviors etc.), having a common set of steering techniques may be challenging. Notably, a decision that works well for one electronic device may not work well for another type of electronic device. Moreover, the usage pattern for a specific instance of an electronic device in a home may be different, in terms of usage frequency, type of data consumed, etc., such that some of the decisions intended to optimize the WLAN may have counterproductive results (such as degrading the communication performance).

Consequently, in the communication technique detailed device information, communication performance and connection behavior over time for clients of an access point or, more generally, in a WLAN may be collected or aggregated directly by a local controller in the WLAN (such as gateway access point 110-1 in FIG. 1) and/or indirectly (e.g., in conjunction with third parties or partners, which may optionally provide device profile information). This aggregated information may be pushed to the cloud, where a comprehensive repository is maintained. Moreover, in some embodiments, additional data may be obtained or derived from a third-party source based at least in part on the device information. Furthermore, the aggregated information and/or the additional data may be used by a cloud-based controller (such as electronic device 124 in FIG. 1) to determine or generate a classifier for a steering profile, which provides transition or steering recommendations for a given electronic device or client in the WLAN. For example, the classifier may be trained using a machine-learning technique (such as logistic regression, LASSO, classification and regression trees, support vector machines, linear regression, nonlinear regression, etc.) or a neural network. Note that the classifier may be provided to the local controller, which may use the classifier to determine whether to recommend a transition, as well as a particular transition recommendation.

Thus, in some embodiments of the communication technique, a hybrid approach may be used, in which execution continues to be controlled locally, but which also uses an analysis engine (such as program instructions, and which is sometimes referred to as a "steering profile recommendation and insight engine" or SPRING) in the cloud-based controller. This analysis engine uses detailed device profiles and historical information from the Wi-Fi clients in the WLAN to determine improved steering or transition recommendations. Moreover, in some embodiments, the data and/or the classifiers may be shared with other controllers. This capability may ensure that the cumulative information in the cloud-based repository grows over time, which may improve the transition recommendations and, thus, may improve the decisions provided by the local controller(s). Note that in some embodiments SPRING is offered as an independent service.

In some embodiments, the communication technique is implemented using a local controller in a gateway access point. This local controller may provide device information that is gathered from clients that connect to the WLAN. In addition, the local controller may forward communication performance and behavioral data of a given client to the cloud-based controller that implements or has access to the SPRING service. In turn, the SPRING service may provide a transition recommendation directly or indirectly (such as in the form a classifier that is used by the local controller to determine whether to provide a transition recommendation, as well as the particular recommended transition. In some embodiments, the SPRING service may periodically provide updates to the transition recommendations and/or the classifier(s).

Moreover, in some embodiments, the cloud-based controller may access a device profile service (which may be associated with a provider of the cloud-based controller or may be an optional third-party service) for at least some of the data used to make a transition recommendation. This device profile service may provide device profile details, such as: a specific device model, a version of software, and/or additional details about a Wi-Fi client that can be used in the transition-recommendation analysis. Notably, because some of the data may not be readily available by directly querying the Wi-Fi client or electronic device, the device profile service may use an electronic "fingerprint" of the electronic device and may access a data structure with the detailed profile information.

Furthermore, in some embodiments, the local controller provides Wi-Fi client data to the data profile service (e.g., via the Internet), which accumulates data about the Wi-Fi client. Subsequently, the local controller provides instances of communication-performance and behavior information to the cloud-based controller, which trains a predictive model (such as a classifier). Then, the local controller may provide a request to the cloud-based controller for a steering recommendation for a particular device identifier. In response, the cloud-based controller may request device profile information from the device profile service and may use this and other information to determine a steerability classification (such as using a pre-trained classifier). Next, the cloud-based controller may provide a steering recommendation for the device identifier to the local controller, which may accordingly perform a steering action.

For example, the aggregated information about a given electronic device that is provided to the cloud-based controller may include: a MAC address or client identifier, a type of electronic device, an operating system, a version of the operating system, one or more communication-performance metrics and, more generally, longer-term non-transitory information. The cloud-based controller may pull profile information for the given electronic device from a cloud-based device profile service. Then, the cloud-based controller may assess the current link or connection, and then may decide or identify an improved link for the given electronic device and the transition recommendation may recommend that the given electronic device transition to the improved link. The transition recommendation may dynamically balance load in the WLAN. Moreover, by placing the electronic devices in the WLAN on specific radios or bands of frequencies, the communication performance in the WLAN may be improved.

The transition recommendation may use basic service set (BSS) transition management to provide a transition recommendation to the given electronic device. However, the given electronic device may decide whether or not to accept the transition recommendation and/or where to move to. For example, an IEEE 802.11v BSS transition management request may be used to tell the given electronic device to look for an access point on a specific channel. The given electronic device may accept or decline this transition recommendation. Alternatively, in some embodiments, the transition recommendation may involve a cart blanc BSS transition management request with multiple access points, and the given electronic device chooses the access point with the best communication performance.

Note that at least some of the decisions or operations in the communication technique may use short-term information (such as information that is available during an instance of an association or connection with the given electronic device), which may not be stored in the cloud. Consequently, at least some of the decisions or operations in the communication technique may be performed by the local controller.

Alternatively, in some embodiments, the local controller may make steering decisions using one or more classifier(s) and communication-performance and behavior information and profile information, which may be stored locally or remotely (such as in the cloud by the cloud-based controller). This approach may be used in the early stages of learning, when there may not be sufficient data for the trained classifier(s) to provide high-confidence transition recommendations. However, in some embodiments, when electronic device associates with an access point in the WLAN, the cloud-based controller may push or provide (in response to a request) capability information (such as one or more classifiers), historical information and/or profile information to the local controller, so that the local controller can make intelligent decisions about transition recommendations.

Moreover, the local controller may aggregate historical information and/or device profile information on a per electronic device basis using multiple techniques (such as device fingerprinting), and this information may be used to periodically or continuously refine one or more classifiers to obtain higher-confidence transition recommendations. In embodiments where the cloud-based controller trains and executes the one or more classifiers in order to provide the SPRING service, the cloud-based controller may periodically update the one or more classifiers on a regular basis based at least in part on any additional information that was aggregated over time.

The communication technique may be used to determine when a transition recommendation is provided to a given electronic device in the WLAN. If an electronic device is always at the same location (a type of behavior in the WLAN), then a transition recommendation may not be needed. Similarly, an electronic device in a house that is not used much typically may also not need a transition recommendation. However, if the location of an electronic device changes often and the electronic device is streaming video and Wi-Fi calls (and, thus, has a high data rate or throughput, and is consuming significant capacity in the WLAN, then the local controller or the cloud-based controller may treat this electronic device more aggressively (in terms of providing transition recommendations) because this electronic device can have a significant impact on the communication performance of the WLAN.

In additional examples, an electronic device used by a father in a home may have a low data rate and bandwidth. This electronic device may use a channel in a 2.4 GHz band of frequencies and may have a low throughput. Therefore, this electronic device may not receive a transition recommendation. However, another electronic device used by a teenager may have a high data rate and bandwidth. This other electronic device may use a high-capacity radio and may have a high throughput (such as a radio with predefined or pre-tested capabilities from a particular provider or manufacturer). Consequently, this other electronic device may regularly receive transition recommendations, because it has a significant impact on the communication performance of the WLAN. The transition recommendations may be based at least in part on specific information about the electronic devices and/or time/usage comparisons to organize the WLAN and to improve communication performance.

Moreover, in some embodiments historical information about previous steering results as a function of time, location and/or electronic device may be stored in the local controller and/or the cloud-based controller. This historical information may used to help guide the transition recommendations. For example, an older or legacy electronic device may not support steering, so a transition recommendation may not be provided to such an electronic device. Similarly, a set-top box may be at a fixed location, so a transition recommendation may also not be provided.

Furthermore, in some embodiments the steering may be used to transition an electronic device from a WLAN to a cellular-telephone network. Alternatively, in some embodiments, a transition recommendation may include having an access point de-authorize an associated electronic device.

As discussed previously, during the communication technique device information may be aggregated. For example, a local controller (such as gateway access point 110-1 in FIG. 1) may discover a specific or unique instance of a client (such as "Joe's cellular telephone") that is associated with gateway access point 110-1 (or another access point in the WLAN). Note that in another home, there may be another person named Joe who has named their cellular telephone "Joe's cellular telephone." The communication technique may disambiguate the clients using specific information of the instance in conjunction with information about gateway access point 110-1. In the discussion that follows, the client is still referred to as "Joe's cellular telephone."

The unique characteristics of Joe's cellular telephone may include a specific model number, storage size, configurable options and a version of the operating system. Moreover, the common characteristics (across multiple electronic devices) of Joe's cellular telephone may include the base hardware configuration for the given model number (such as support for 2.4 GHz, 5 GHz, 60 GHz or another band of frequencies, antennas, transmit power, receive sensitivity, Wi-Fi chipset, etc.), the manufacturer, etc. Furthermore, there may be a separate set of unique data associated with Joe's cellular telephone, which may reflect the historical communication performance and behavior of this specific device, in terms of connectivity (such as time-slot interval, when associated, which access point it was associated with, idle or active, etc.), data usage (such as time-slot interval, traffic type, upstream and downstream data usage, etc.), communication-performance metrics, locations in the WLAN, etc. This data may be used by the SPRING service to train one or more classifiers and/or determine transition recommendations.

An instance of the classifier may be used by the cloud-based controller and/or the local controller to predict when and where to steer a given electronic device based at least in part on profile information, communication performance in the WLAN, behavior in the WLAN and/or responses to previous transition recommendations. For example, the cloud-based controller may use the classifier to determine a transition recommendation in response to a request from the local controller, where this request may specify a timeslot and a given electronic device. Thus, an instance of the classifier may determine whether or not to steer the given electronic device. If yes, the classifier may indicate a channel or band-of-frequency preference (2.4 GHz, 5 GHz, 60 GHz or another band of frequencies), an access-point preference, a wireless-network preference, etc.

While the preceding discussion used a classifier as an illustration, in other embodiments a regression model (such as linear regression) may be used (either separately or in conjunction with the classifier) to predict a likelihood that a transition recommendation will be accepted (or rejected) by the given electronic device. In some embodiments, the regression model may include a decision tree (such as a classification and decision tree). The decision tree may depend on factors or features such as: a type of electronic device (e.g., a set-top box would not be steered), a transmit power, a receive sensitivity, a number of spatial streams, information specifying a Wi-Fi chipset, a number of antennas, etc. During training of a decision tree, a table may be generated with input electronic devices having different characteristics, and predefined outputs or outcomes. Using this table, a decision tree may be generated. Next, the decision tree may be validated on additional data to ensure that the prediction is in line with the actual or desired outcomes.

We now describe embodiments of an electronic device, which may perform at least some of the operations in the communication technique. FIG. 5 presents a block diagram illustrating an example of an electronic device 500 in accordance with some embodiments, such as one of access points 110, one of electronic devices 112 or electronic device 124. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, one or more graphics process units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a network node that can be coupled or connected to a network or link, or a pad that can be coupled to the one or more antennas 520. Thus, electronic device 500 may or may not include the one or more antennas 520.) For example, networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called "exclusion regions" or "exclusion zones" (which are sometimes referred to as "notches" or "nulls"). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Moreover, in some embodiments a "network" or a "connection" between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 are included in operating system 524 and/or control logic 516 is included in interface circuit 518. In some embodiments, the communication technique is implemented using information in layer 2 and/or layer 3 of the Open System Interconnection model.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a "communication circuit") may implement some or all of the functionality of networking subsystem 514 (or, more generally, of electronic device 500). The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that "monitoring" as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a cable modem communication protocol, Ethernet and a Wi-Fi communication protocol as an illustrative example, in other embodiments a wide variety of communication protocols and, more generally, wired and/or wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 522, operating system 524 (such as a driver for interface circuit 518) or in firmware in interface circuit 518. Alternatively or additionally, at least some of the operations in the communication technique may be implemented in a physical layer, such as hardware in interface circuit 518.

In the preceding description, we refer to "some embodiments." Note that "some embodiments" describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A gateway access point, comprising:
a network node;
an antenna node coupled to an antenna and to the network node, for transmitting and receiving packets in a wireless local area network (WLAN); and
an interface circuit, coupled to the network node and the antenna node, configured to communicate with an electronic device associated with a first access point in the WLAN, to communicate with a second access point in the WLAN, and to communicate with a remote, cloud-based controller in a second network, and wherein the interface circuit includes local control logic to provide a local controller and to configure the interface circuit to:
aggregate communication-performance information and behavior information (CPBI) in the WLAN corresponding to the first access point, the second access point, and the electronic device, wherein the CPBI are aggregated over a time interval that is longer than an instance of a connection or association of the electronic device to the WLAN;
provide, to the network node, the CPBI to send by the antenna node to the remote, cloud-based controller;
receive, from the network node, information about the electronic device associating with the second access point in the WLAN;
in response to receiving the information about the electronic device associating with the second access point, send, via the network node and the antenna node, a request to the remote, cloud-based controller for historical information about the CPBI of at least one of the electronic device, the first access point, and the second access point;
receive, via the network node from the remote, cloud-based controller, the historical information about the CPBI of the at least one of the electronic device, the first access point, and the second access point; and
selectively send, via the network node and the antenna node, a transition recommendation in the WLAN to the electronic device, wherein the transition recommendation is based at least in part on the historical information about the CPBI of the at least one of the electronic device, the first access point, and the second access point, and instructs the electronic device to perform at least one of a transition to the second access point in the WLAN, transition to a different channel, and transition to a different wireless network.

2. The access point of claim 1, wherein the access point is configured to:
receive, at the network node or the antenna node, profile information from the electronic device; and
provide, to the network node, the profile information to the second electronic device.

3. The access point of claim 2, wherein the access point is configured to obfuscate at least a portion of the profile information before the profile information is provided.

4. The access point of claim 2, wherein the profile information comprises one or more of: a media access control (MAC) address or a client identifier of the electronic device, a type of the electronic device, an operating system of the electronic device, and a version of the operating system.

5. The access point of claim 2, wherein, when the access point receives the information about the other instance of connection or association of the electronic device to the WLAN, the access point is configured to:
provide, to the network node, a request for the profile information to the second electronic device; and
receive, at the network node, the profile information from the second electronic device.

6. The access point of claim 2, wherein the transition recommendation is based at least in part on the profile information.

7. The access point of claim 1, wherein the aggregated communication-performance information and behavior information corresponds to multiple electronic devices that communicate via the WLAN; and
wherein the aggregated communication-performance information and behavior information comprises one or more of: a received signal strength of a given electronic device in the multiple electronic devices, a data rate of the given electronic device, a throughput of the given electronic device, a capacity of the given electronic device, a usage of the given electronic device, a location of the given electronic device, a given access point that is associated with the given electronic device, and a number of connected electronic devices in the WLAN.

8. The access point of claim 1, wherein the second electronic device comprises a controller for the WLAN.

9. The access point of claim 1, wherein the transition recommendation are compatible with an Institute of Electrical and Electronics Engineers (IEEE) 802.11 standard.

10. The access point of claim 1, wherein the transition recommendation is based at least in part on a result of at least a previous transition recommendation in the WLAN.

11. The access point of claim 10, wherein the access point is configured to:
provide, to the network node, a request for second historical information about previous transition recommendations to the second electronic device; and
receive, at the network node, the second historical information from the second electronic device.

12. The access point of claim 1, wherein the different wireless network may include a cellular-telephone network.

13. The access point of claim 1, wherein the access point and the second access point have a common configuration, including common access credentials.

14. A non-transitory computer-readable storage medium for use in conjunction with a gateway access point, the computer-readable storage medium storing program instructions that, when executed by the gateway access point, causes the gateway access point to selectively provide a transition recommendation by performing operations comprising:
aggregating communication-performance information and behavior information (CPBI) in a first network comprising a wireless local area network (WLAN) corresponding to an electronic device associated with a first access point in the WLAN, the first access point in the WLAN, and a second access point in the WLAN, wherein the CPBI are aggregated over a time interval that is longer than an instance of connection or association of the electronic device to the WLAN;
sending the CPBI to a remote, cloud-based controller in a second network;
receiving information about the electronic device associating with the second access point in the WLAN;
in response to receiving the information about the electronic device associating with the second access point, sending a request to the remote, cloud-based controller in the second network for historical information about the CPBI of the at least one of the electronic device, the first access point, and the second access point;
receiving, from the remote, cloud-based controller in the second network, the historical information about the CPBI of the at least one of the electronic device, the first access point, and the second access point; and
selectively sending the transition recommendation in the WLAN to the electronic device, wherein the transition recommendation is based at least in part on the historical information about the CPBI of the at least one of the electronic device, the first access point, and the second access point, and instructs the electronic device to perform at least one of a transition to the second access point in the WLAN, transition to a different channel, and transition to a different wireless network.

15. The non-transitory computer-readable storage medium of claim 14, wherein the operations further comprise:
receiving profile information from the electronic device;
obfuscating at least a portion of the profile information; and
providing the profile information to the second electronic device.

16. The non-transitory computer-readable storage medium of claim 14, wherein the transition recommendation is based at least in part on profile information from the electronic device or a result of at least a previous transition recommendation in the WLAN.

17. A method for selectively providing a transition recommendation by a gateway access device, comprising:
aggregating communication-performance information and behavior information (CPBI) in a first network comprising a wireless local area network (WLAN) corresponding to an electronic device associated with a first access point in the WLAN, the first access point in the WLAN, and a second access point in the WLAN, wherein the CPBI are aggregated over a time interval that is longer than an instance of connection or association of the electronic device to the WLAN;
sending the CPBI to a remote, cloud-based controller in a second network;
receiving information about the electronic device associating with the second access point in the WLAN;
in response to receiving the information about the electronic device associating with the second access point, sending a request to the remote, cloud-based controller in the second network for historical information about the CPBI of the at least one of the electronic device, the first access point, and the second access point;
receiving, from the remote, cloud-based controller in the second network, the historical information about the CPBI of the at least one of the electronic device, the first access point, and the second access point; and
selectively sending the transition recommendation in the WLAN to the electronic device, wherein the transition recommendation is based at least in part on the historical information about the CPBI of the at least one of the electronic device, the first access point, and the second access point, and instructs the electronic device to perform at least one of a transition to the second access point in the WLAN, transition to a different channel, and transition to a different wireless network.

18. The method of claim 17, wherein the transition recommendation is based at least in part on profile information from the electronic device or a result of at least a previous transition recommendation in the WLAN.

* * * * *